May 27, 1958    J. W. CROWNOVER    2,836,738
PRESTRESSED PIEZO CRYSTAL
Filed May 2, 1956

JOSEPH W. CROWNOVER,
INVENTOR.

BY William W. Haefliger
AGENT.

United States Patent Office 2,836,738
Patented May 27, 1958

2,836,738

PRESTRESSED PIEZO CRYSTAL

Joseph W. Crownover, Sherman Oaks, Calif.

Application May 2, 1956, Serial No. 582,132

12 Claims. (Cl. 310—8.5)

This invention relates generally to actuators of the electro-mechanical transducer type, and more particularly has to do with an improved actuator employing an electrostrictive ceramic material working in conjunction with a metal base in such relation that the base distorting capacity of the ceramic material in response to application of voltage to the material is substantially increased, thereby materially improving the practical effectiveness and efficiency of the actuator.

It is a major object of the invention to provide a novel actuator in which electrostrictive ceramic material, for example of the barium or strontium titanate class, is combined in such working relation with a base or support as to fully utilize two dimensional displacement of the ceramic in the plane thereof either to efficiently distort or flex the base in response to application of voltage across the thickness dimension of the ceramic or conversely to produce voltage at the ceramic electrodes in response to flexing of the base, thereby achieving substantially improved coupling and response as between the ceramic and base.

The invention realizes this primary object through the provision of a relatively thin ceramic connected with a side of a relatively thin, preferably metallic base, the ceramic having electrodes connected with opposite faces thereof and extending about a space opposite the base side. In its preferred form, the ceramic is substantially annular, although the broad contemplation of the invention includes other ceramic shapes insofar as they have effective extent about or around an intermediate space at the side of the base. As will be seen, this particular ceramic configuration permits electrostrictive working, as for example ceramic contraction in the plane thereof, in two dimensions such as the radial and circular modes in the case of an annular ceramic, resulting in increased displacement of the base in response to application of voltage across the thickness dimension of the ceramic or conversely in increased production of voltage across the ceramic thickness dimension in response to displacement of the base.

Another objective of the invention is the provision of an electro-mechanical transducer of the above referred to general construction which is particularly well suited for application to devices in which a diaphragm must move with maximum peak to peak displacement or amplitude in response to the application of an electrical signal to the transducer, as in telephone speakers and loudspeakers in general, and conversely to devices in which an electrical signal of maximum strength or amplitude must be produced in response to movement of a diaphragm, as for example in telephone receivers or microphones. In such applications, the thin intermediate portion of the metal base of the actuator serves as the diaphragm with the annular electrostrictive ceramic actuating or responding to diaphragm movement.

A further object of the invention is the provision of a novel relay assembly in which displacement of the movable contact supporting portion of the relay is significantly increased through the efficient utilization of the electrostrictive properties of the actuating ceramic, including contraction of the ceramic in two perpendicular modes or dimensions. With application of voltage across the thickness dimension of a thin, annular ceramic material connected with a thin, flexible base, contraction of the ceramic in the radial mode symmetrically bends the annular strip of base to which the ceramic connects to displace the intermediate or center of the base in one direction, and contraction of the ceramic in the circular mode contracts the annular base strip and ceramic as a whole, increasing the resultant lateral displacement of the base center under those conditions that will be set out fully in the description.

These and other objects and advantages of the invention as well as the details of an illustrative embodiment will be more fully understood from the following description of the drawing, in which.

Figure 1:
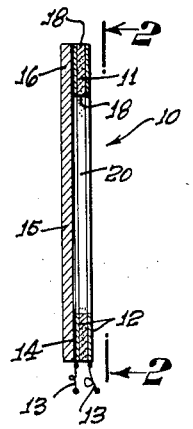
Figure 1 is an elevation showing one form of the actuator in section at high or low ceramic and base connecting temperatures.
Figure 2:
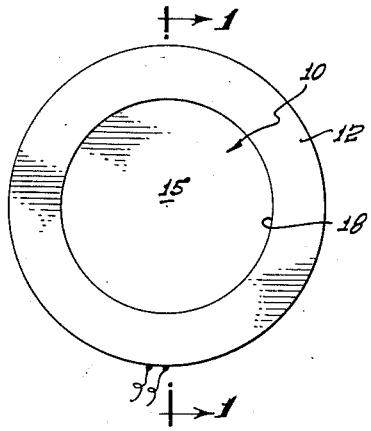
Figure 2 is a plan view of the actuator shown in Figure 1.

The actuator shown in Figures 1 and 2 includes a relatively thin base 10 of flexible material such as a thin metallic sheet with circular configuration, and an annular, relatively thin electrostrictive ceramic 11 connected flatly against the base. Suitably thin electrodes 12, typically comprising silver paint capable of intimate contact with ceramic surface irregularities, are connected with opposite sides or faces of the ceramic to provide for application of voltage through suitable terminals 13 to the electrodes. The ceramic and base are shown as firmly connected together by a bonding layer 14 which may comprise any of a number of suitable materials such as solder or an epoxide resin.

While the invention broadly contemplates connection of the base and ceramic at any convenient temperature, it is desirable from the standpoint of actuator configuration during operation that the base and ceramic be joined at temperatures well above or below the normal expected operating temperatures and that the ceramic and base have different thermal coefficients of expansion, designated $\alpha_m$ for the metal base and $\alpha_c$ for the ceramic, in order to take advantage of differential thermal expansion and contraction of the base and ceramic in arriving at the desired actuator configuration. The latter should be such that the intermediate or center portion 15 of the base be dished or protrude laterally with respect to the annular base portion 16 connected with the ceramic, at normal operating temperatures, so that the intermediate base portion will not be displaced over-center during operation.

Figure 3:
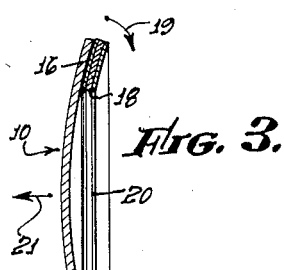
Figure 3 is an elevation showing the Figure 1 actuator section at normal operating temperatures.

To ensure that the flat base 15 shown in Figure 1 will assume the desired dished shape of Figure 3, $\alpha_c$ should be greater than $\alpha_m$ in those instances where the ceramic and base are joined together at elevated temperatures, whereas $\alpha_m$ should be greater than $\alpha_c$ when the ceramic and base are connected at below normal temperatures, as by cold cementing them together. When these appropriate relationship exist, cooling or heating of the actuator to operating temperatures as the case may be results in relative shrinkage of the ceramic with respect to the metal base in the case of cooling, and relative expansion of the metal base with respect to the ceramic in the case of heating, the ceramic under either circumstance being placed in tension and positioning itself at the inside of the curve assumed by the base. The latter is then held in compression by the ceramic.

Figure 6:
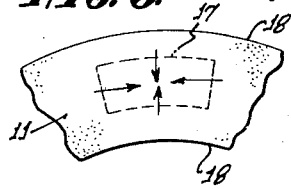
Figure 6 is a fragmentary plan view of an annular portion of the ceramic showing its two modes of contraction.

When voltage is applied to the electrodes across the thickness dimension of the electrostrictive ceramic, it expands in that dimension and contracts in the radial and circular dimensions of the annulus, as shown by the perpendicular sets of arrows in Figure 6 applied to a broken line fragment 17 of the ceramic. Radial contraction results in relative shrinkage together of concentric inner and outer edges 18 of the ceramic acting to twist or bend the annular connected portion 16 of the base in the direction of arrows 19, thereby relatively displacing the intermediate portion 15 of the open base away from the space 20 formed by the ceramic and about which the ceramic extends. Furthermore, electrostrictive contraction of the ceramic in the circular mode produces a net diametral contraction of the ceramic annulus as a whole and with respect to the base so that the intermediate portion of the latter is additionally displaced in the direction of arrow 21. With both modes of electrostrictive contraction being utilized, it is evident that effective coupling or response of the ceramic and base is present.

Figure 4:
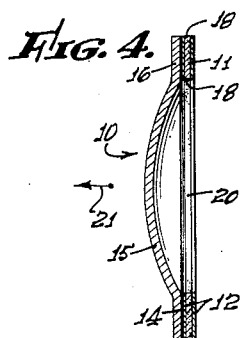
Figure 4 is an elevation showing another form of the actuator in section at high or low ceramic and base connecting temperatures.
Figure 5:
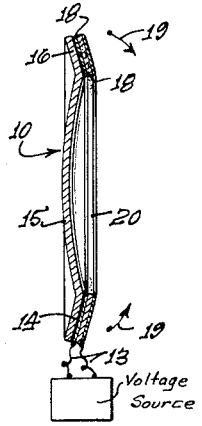
Figure 5 is an elevation showing the Figure 4 actuator section at normal operating temperatures.

Referring to the embodiment shown in Figures 4 and 5, the intermediate portion 15 of the base is dished in the opposite direction from the dished condition of annular base portion 16 connected with the ceramic, the latter being at the outside of the curvature of base portion 16 and in compression at normal operating temperatures. Figure 4 shows that intermediate portion 15 is in preformed, dished condition at bonding temperatures of the ceramic and base, whereas connected base portion 16 is relatively flat at those temperatures. To ensure that the ceramic will be placed in compression under operating temperatures, $\alpha_m$ should be greater than $\alpha_c$ in those instances where the ceramic and base are joined at elevated temperatures, whereas $\alpha_c$ should be greater than $\alpha_m$ where the ceramic and base are connected at below normal temperatures.

Figure 7:
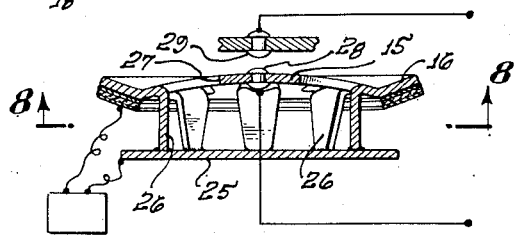
Figure 7 is an elevation through the novel relay incorporating the actuator.
Figure 8:
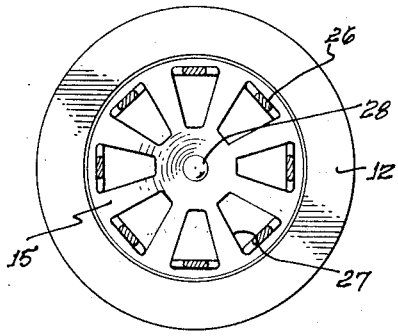
Figure 8 is a section taken on line 8—8 of Figure 7.

The actuator of Figures 4 and 5 is incorporated into the novel relay shown in Figure 7 to include a support 25 to which are joined depending circularly spaced legs 26 conveniently punched from intermediate portion 15 of the base, the legs connecting with the latter portion near the base portion 16. Openings 27 left in the base serve to reduce the elastic stiffness of intermediate portion 15, freeing it for greater displacement in response to voltage application to the ceramic electrodes. A suitable movable contact 28 carried at the center of base portion 15 is provided for engagement with fixed contact 29 thereabove when the relay is operated. Balancing of the relay may be provided by adjusting the overhang of annular base portion 16 in relation to the weight of intermediate portion 15 so that the latter is not displaced critically during acceleration of the relay.

Suitable ceramic for use in the present invention may comprise polycrystalline barium and/or strontium titanate, and the base may comprise nickel steel. Known nickel steels have thermal coefficients of expansion greater and lesser than that of barium titanate; for example, reference is made to commercial Carpenter steels #49 and #42 which respectively have thermal coefficients of expansion greater and lesser than that of barium titanate. For diaphragm operation, the base may be around .020 inch thick and the ceramic approximately .007 inch thick. As shown in the drawings, the ceramic and base are each substantially thinner than the width or transverse dimension of the bond 14.

I claim:

1. A mechano-electric transducer, including a relatively thin metal sheet, a relatively thin substantially annular electrostrictive ceramic rigidly bonded to a side of said sheet and forming an open space opposite a sheet intermediate portion said sheet and ceramic each being substantially thinner than the width of said bond, said ceramic and sheet having different thermal coefficients of expansion and holding one another in strained condition at normal operating temperatures of the transducer, and electrodes connected with opposite faces of the ceramic accommodating application of voltage across the ceramic between said faces, whereby said ceramic may be caused to contract in radial and circular dimensions thereof thereby distorting the sheet to displace said sheet intermediate portion relative to said space.

2. The invention as defined in claim 1 in which said metal sheet is dished in said strained condition.

3. The invention as defined in claim 2 in which the ceramic is connected with the inner side of the dished sheet.

4. The invention as defined in claim 3 in which said metal sheet expansion coefficient is larger than said ceramic expansion coefficient.

5. The invention as defined in claim 3 in which said ceramic expansion coefficient is larger than said sheet expansion coefficient.

6. The invention as defined in claim 1 in which said bonded and intermediate portions of the metal sheet are oppositely dished in said strained condition.

7. The invention as defined in claim 6 in which the ceramic is bonded to the outer side of the dished sheet.

8. The invention as defined in claim 7 in which said metallic sheet expansion coefficient is larger than said ceramic expansion coefficient.

9. The invention as defined in claim 7 in which said ceramic expansion coefficient is larger than said metallic sheet expansion coefficient.

10. An improved relay assembly, comprising a relatively thin metal sheet, means mounting said sheet for relative displacement of an intermediate portion thereof, an electrical contact carried by said intermediate portion, a relatively thin substantially annular electrostrictive ceramic rigidly bonded to a side of said sheet and forming an open space opposite said intermediate portion, said sheet and ceramic each being substantially thinner than the width of said bond, said sheet and ceramic having different thermal coefficients of expansion and holding one another in strained dished conformation at normal relay operating temperatures, and electrodes connected with opposite faces of the ceramic accommodating application of voltage across the ceramic between said faces, whereby said ceramic may be caused to contract in radial and circular dimensions thereof thereby distorting the sheet to displace said intermediate portion thereof and said contact relative to said space.

11. The invention as defined in claim 10 in which said intermediate portion contains circularly spaced openings for reducing the bending stiffness thereof.

12. The invention as defined in claim 10 in which said mounting means comprise circularly spaced legs connecting with the sheet about said intermediate sheet portion.

References Cited in the file of this patent

UNITED STATES PATENTS

| | | |
|---|---|---|
| 1,525,823 | Nicolson | Feb. 10, 1925 |
| 2,182,340 | Hearn | Dec. 5, 1939 |
| 2,195,417 | Mason | Apr. 2, 1940 |
| 2,386,279 | Tibbetts | Oct. 9, 1945 |
| 2,403,692 | Tibbetts | July 9, 1946 |
| 2,477,596 | Gravley | Aug. 2, 1949 |
| 2,487,962 | Arndt | Nov. 15, 1949 |
| 2,607,858 | Mason | Aug. 19, 1952 |

OTHER REFERENCES

Smithsonian Physical Tables by Fowle (seventh edition revised), page 218.